US011953088B2

(12) United States Patent
Saito et al.

(10) Patent No.: US 11,953,088 B2
(45) Date of Patent: Apr. 9, 2024

(54) SHIFT DEVICE (71) Applicant: KABUSHIKI KAISHA TOKAI-RIKA-DENKI-SEISAKUSHO, Aichi-ken (JP)

(72) Inventors: Kazuhiro Saito, Aichi (JP); Hironori Watanabe, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 18/196,480

(22) Filed: May 12, 2023

(65) Prior Publication Data

US 2023/0366459 A1 Nov. 16, 2023

(30) Foreign Application Priority Data

May 16, 2022 (JP) ................. 2022-080287

(51) Int. Cl.
F16H 59/10 (2006.01)
F16H 59/12 (2006.01)

(52) U.S. Cl.
CPC .......... *F16H 59/105* (2013.01); *F16H 59/12* (2013.01)

(58) Field of Classification Search
CPC .......... F16H 59/12; H01H 3/122; H01H 3/12; H01H 2003/007
See application file for complete search history.

(56) References Cited

U.S. PATENT DOCUMENTS

| 5,152,392 | A  | * | 10/1992 | Iwasa   | H01H 13/705 |
|           |    |   |         |         | 200/341     |
| 7,541,553 | B2 | * | 6/2009  | Meyer   | H01H 13/72  |
|           |    |   |         |         | 200/310     |
| 10,325,734| B1 | * | 6/2019  | Lijima  | H01H 13/14  |
| 10,760,679| B2 | * | 9/2020  | Na      | F16H 59/12  |
| 10,907,729| B2 | * | 2/2021  | Sage    | F16H 59/12  |
| 2020/0149628 | A1 |  | 5/2020 | Na et al. | |

* cited by examiner

*Primary Examiner* — Gregory Robert Weber (74) *Attorney, Agent, or Firm* — Studebaker & Brackett PC (57) ABSTRACT A shift device including: a shift switch that, when operated, is configured to change a shift range of a transmission of a vehicle; and a tact switch that is provided in the shift switch and is operated as a result of the shift switch being operated.

7 Claims, 11 Drawing Sheets

SHIFT DEVICE

CROSS-REFERENCE TO RELATED APPLICATION

This application is based on and claims priority under 35 USC 119 from Japanese Patent Application No. 2022-80287 filed on May 16, 2022, the disclosure of which is incorporated by reference herein.

BACKGROUND

Technical Field

The present disclosure relates to a shift device where a shift range of a transmission is changed as a result of a shift switch being operated.

Related Art

US Patent Application Publication No. 2020/0149628 discloses a shifting control apparatus where gears of a vehicle are changed when gear switches are pressed.

Here, in this shifting control apparatus, the gear switches are provided with plural contact switches.

SUMMARY

In consideration of the above circumstances, it is an object of the present disclosure to obtain a shift device where a shift switch can produce an operating sound.

A shift device of a first aspect of the present disclosure includes: a shift switch that, when operated, is configured to change a shift range of a transmission of a vehicle; and a tact switch that is provided in the shift switch and is operated as a result of the shift switch being operated.

In the shift device of the first aspect of the present disclosure, the shift range of the transmission of the vehicle is changed as a result of the shift switch being operated.

Here, the shift switch is provided with the tact switch, and the tact switch is operated as a result of the shift switch being operated. For this reason, the tact switch produces an operating sound, so the shift switch can produce an operating sound.

A shift device of a second aspect of the present disclosure is the shift device of the first aspect of the present disclosure, further including a first increasing portion that increases an operating load of the shift switch before a rate of increase in an operating load of the tact switch changes from a small state to a large state.

In the shift device of the second aspect of the present disclosure, the first increasing portion increases the operating load of the shift switch before the rate of increase in the operating load of the tact switch changes from a small state to a large state. For this reason, the rate of increase in the operating load of the shift switch can be inhibited from changing when the rate of increase in the operating load of the tact switch changes from a small state to a large state.

A shift device of a third aspect of the present disclosure is the shift device of the first aspect or the second aspect of the present disclosure, further including an additional switch that is provided in the shift switch and is operated as a result of the shift switch being operated.

In the shift device of the third aspect of the present disclosure, the additional switch is provided in the shift switch, and the additional switch is operated as a result of the shift switch being operated. For this reason, the operation of the shift switch can be appropriately detected.

A shift device of a fourth aspect of the present disclosure is the shift device of the third aspect of the present disclosure, further including a second increasing portion that increases an operating load of the shift switch before a rate of increase in an operating load of the additional switch changes from a small state to a large state.

In the shift device of the fourth aspect of the present disclosure, the second increasing portion increases the operating load of the shift switch before the rate of increase in the operating load of the additional switch changes from a small state to a large state. For this reason, the rate of increase in the operating load of the shift switch can be inhibited from changing when the rate of increase in the operating load of the additional switch changes from a small state to a large state.

BRIEF DESCRIPTION OF THE DRAWINGS

Exemplary embodiments of the present disclosure will be described in detail based on the following figures, wherein.

DETAILED DESCRIPTION

First Embodiment

Figure 1A:
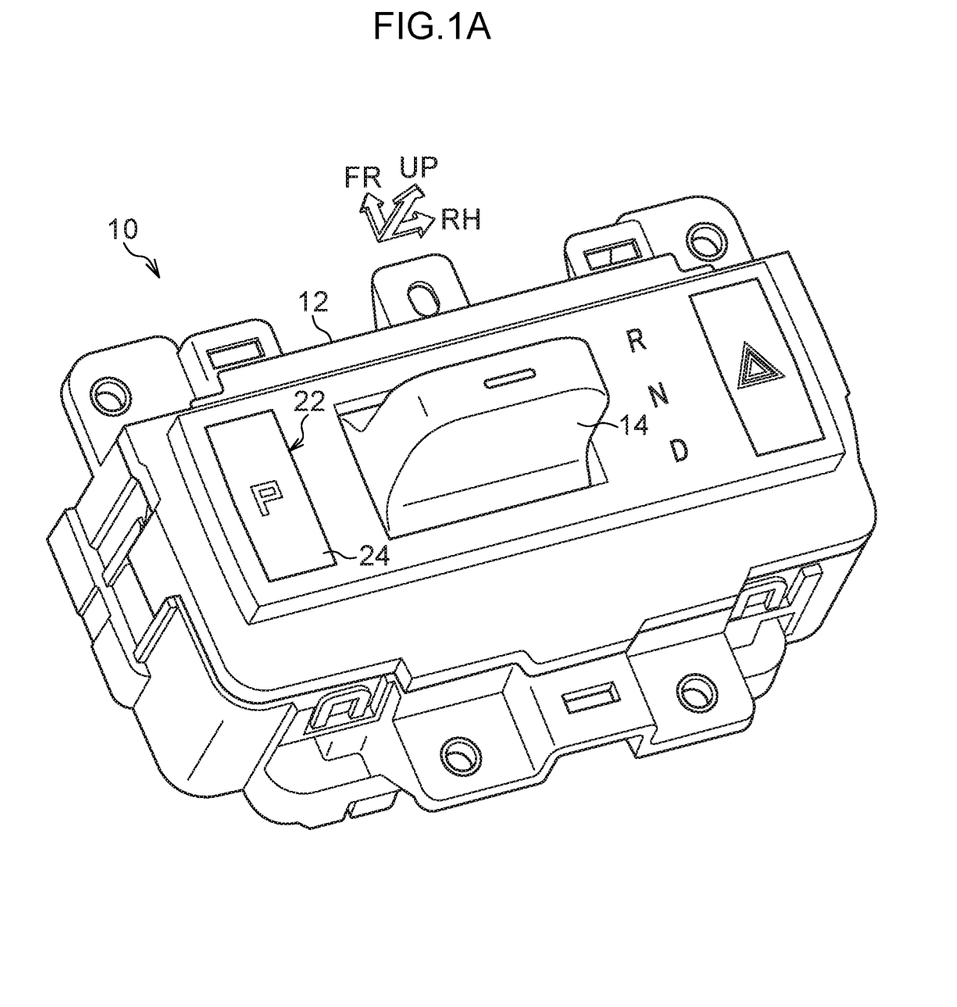
FIG. 1A is a perspective view of a shift device pertaining to a first embodiment of the present disclosure as seen obliquely from the left and rear.
Figure 1B:
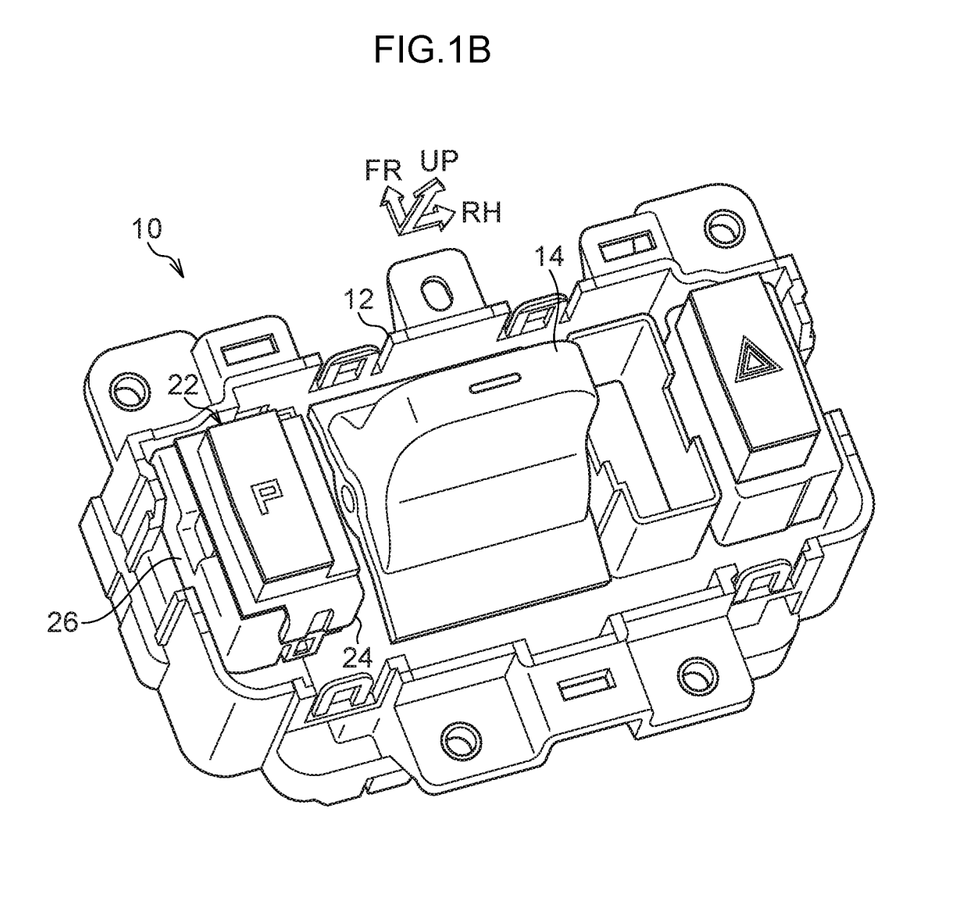
FIG. 1B is a perspective view of the inside of the shift device pertaining to the first embodiment of the present disclosure as seen obliquely from the left and rear.

In FIG. 1A a shift device 10 pertaining to a first embodiment of the present disclosure is shown in a perspective view as seen obliquely from the left and rear, and in FIG. 1B the inside of the shift device 10 is shown in a perspective view as seen obliquely from the left and rear. It will be noted that, in the drawings, arrow FR indicates a forward direction of the shift device 10, arrow RH indicates a rightward direction of the shift device 10, and arrow UP indicates an upward direction of the shift device 10.

The shift device 10 pertaining to the present embodiment is installed in a console (not shown in the drawings) of a vehicle (an automobile), and the forward direction, the rightward direction, and the upward direction of the shift device 10 are aligned with the forward direction, the rightward direction, and the upward direction, respectively, of the vehicle.

As shown in FIG. 1A and FIG. 1B, the shift device 10 is provided with a plate 12 substantially in the shape of a cuboidal box and serving as an installation body. The plate 12 is secured inside the console (not shown in the drawings), and its upper wall is exposed through the console to the cabin.

In the left and right direction middle portion in the plate 12 is provided a lever 14 substantially in the shape of a triangular prism and serving as a shift body, and the lower portion of the lever 14 is enlarged in the front and rear direction. The lever 14 is supported at its lower portion so as to be pivotable in the front and rear direction in the plate 12, and the lever 14 pivotably runs through the upper wall of the plate 12. The lever 14 is pivotally operable at its upper portion by an occupant (particularly a driver) of the vehicle, and when the lever 14 is pivoted, the shift position of the lever 14 is changed to a reverse (R) position, a neutral (N) position, and a drive (D) position.

Figure 3:
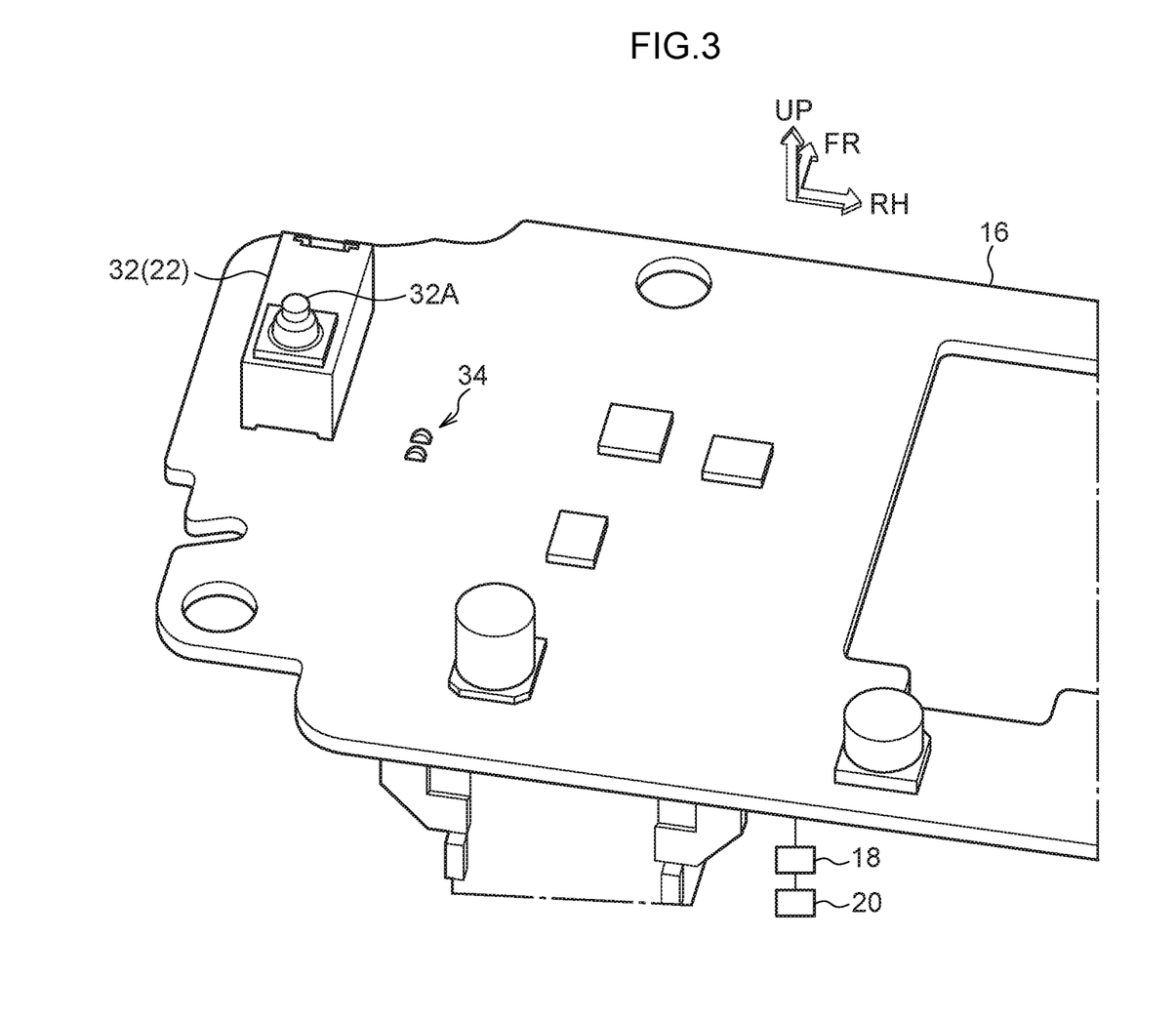
FIG. 3 is a perspective view of a circuit board of the shift device pertaining to the first embodiment of the present disclosure as seen obliquely from the right and rear.

To the lower portion in the plate 12 is secured a circuit board 16 (see FIG. 3) substantially in the shape of a rectangular plate and serving as a detection device, and the circuit board 16 is disposed perpendicular to the up and down direction. The circuit board 16 can detect the shift position of the lever 14 by detecting the pivot position of the lever 14. The circuit board 16 is electrically connected to a control device 18 of the vehicle, and to the control device 18 is electrically connected a transmission 20 (an automatic transmission) of the vehicle.

In the left portion of the plate 12 is provided a P switch 22 serving as a shift switch.

Figure 4A:
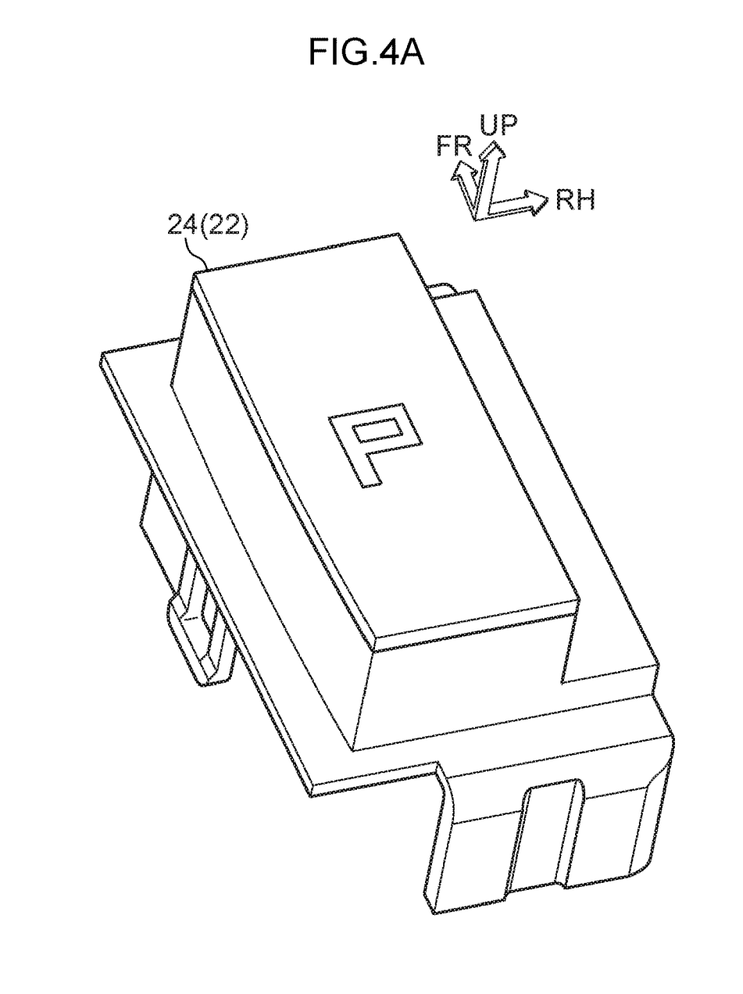
FIG. 4A is a perspective view of an operation frame of the P switch of the shift device pertaining to the first embodiment of the present disclosure as seen obliquely from above and the rear.
Figure 4B:
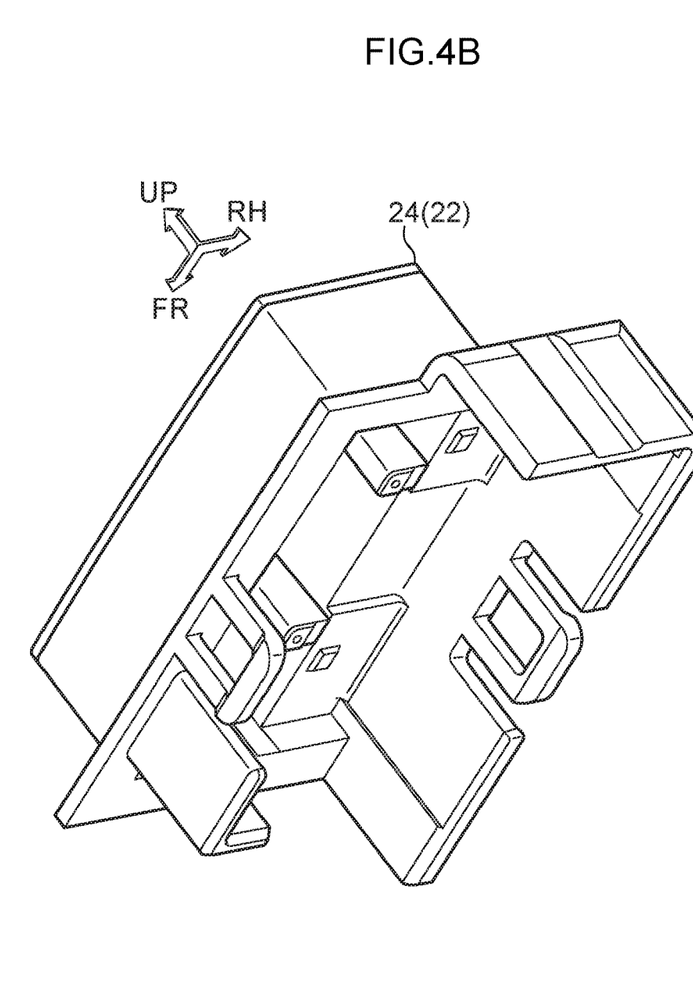
FIG. 4B is a perspective view of the operation frame of the P switch of the shift device pertaining to the first embodiment of the present disclosure as seen obliquely from below and the left.

In the upper portion of the P switch 22 is provided an operation frame 24 (see FIG. 4A and FIG. 4B) substantially in the shape of a bottomed rectangular tube and serving as an operation portion, and the inside of the operation frame 24 opens downward. The operation frame 24 runs through the upper wall of the plate 12, and its upper wall is exposed above through the plate 12. The upper wall of the operation frame 24 is pressingly operable downward by the occupant.

Figure 2A:
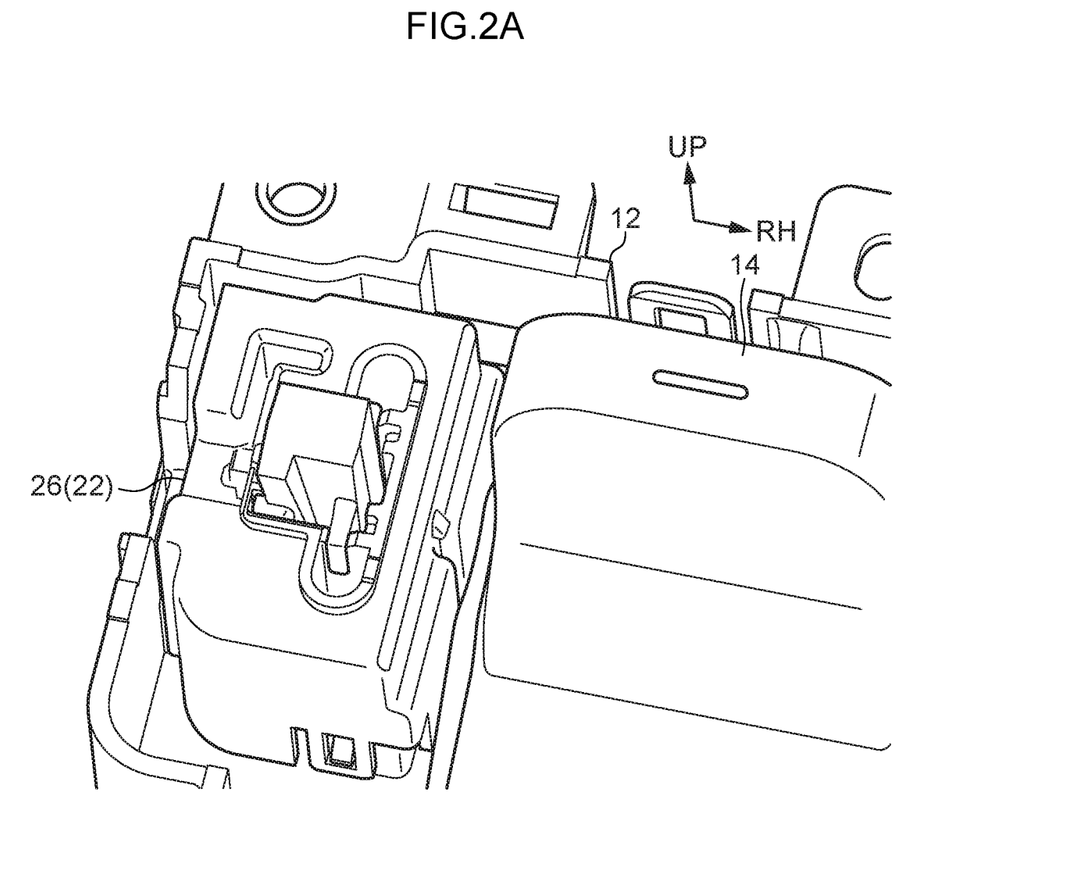
FIG. 2A is a perspective view of a holder of a P switch and other parts of the shift device pertaining to the first embodiment of the present disclosure as seen obliquely from the right and rear.
Figure 5A:
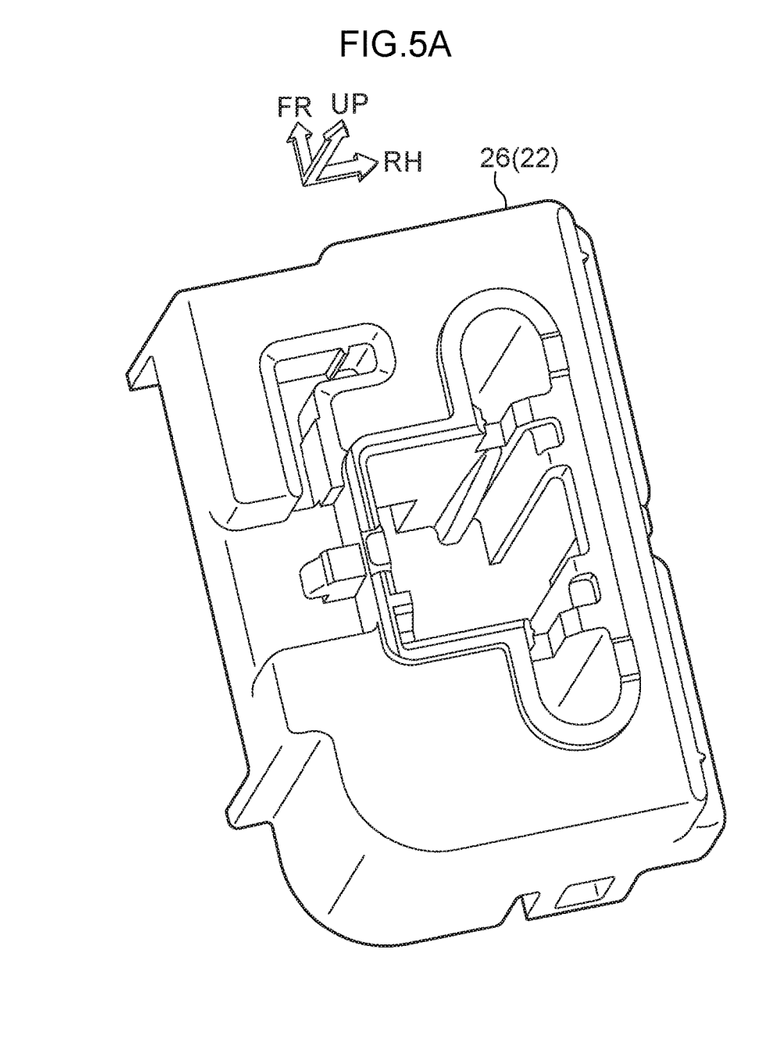
FIG. 5A is a perspective view of the holder of the P switch of the shift device pertaining to the first embodiment of the present disclosure as seen obliquely from above and the rear.
Figure 5B:
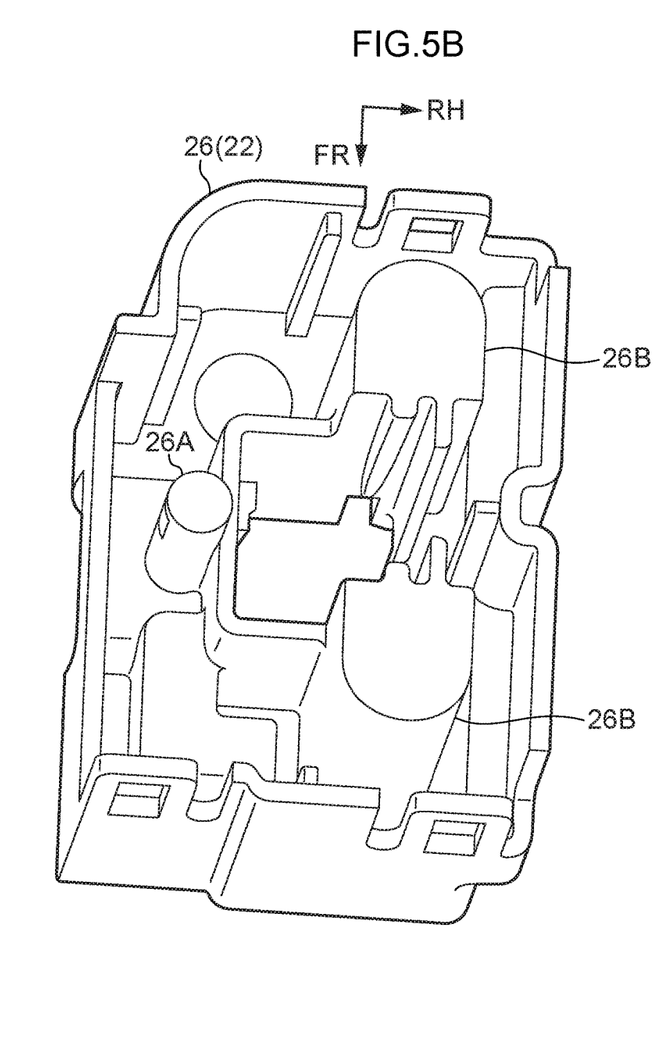
FIG. 5B is a perspective view of the holder of the P switch of the shift device pertaining to the first embodiment of the present disclosure as seen obliquely from below and the front.

To the lower side of the operation frame 24 is secured a holder 26 (see FIG. 2A, FIG. 5A, and FIG. 5B) substantially in the shape of a bottomed rectangular tube and serving as a moving portion. The inside of the holder 26 opens downward, and the holder 26 is supported so as to be movable in the up and down direction in a predetermined range in the plate 12. On the left portion of the upper wall of the holder 26, a left column 26A substantially in the shape of a cylinder and serving as a moving site is integrally provided, and the left column 26A extends downward. On the front portion and the rear portion of the right portion of the upper wall of the holder 26, right columns 26B substantially in the shape of bottomed semicircular tubes and serving as moving sites are integrally provided. The right columns 26B extend downward, and their insides open upward.

Figure 2B:
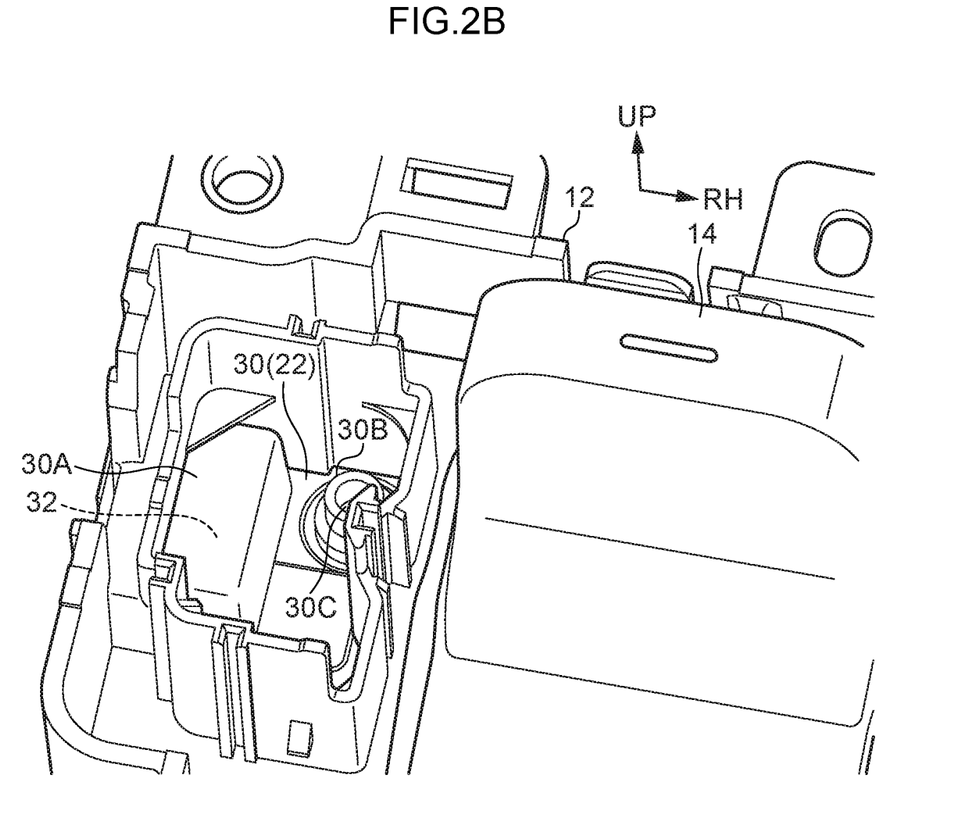
FIG. 2B is a perspective view of a cover plate of the P switch and other parts of the shift device pertaining to the first embodiment of the present disclosure as seen obliquely from the right and rear.

On the lower side of the holder 26 is provided a cover plate 30 (see FIG. 2B and FIG. 6A) substantially in the shape of a rectangular plate and serving as a cover member. The cover plate 30 is secured to the circuit board 16, is made of rubber, and is elastic.

Figure 6A:
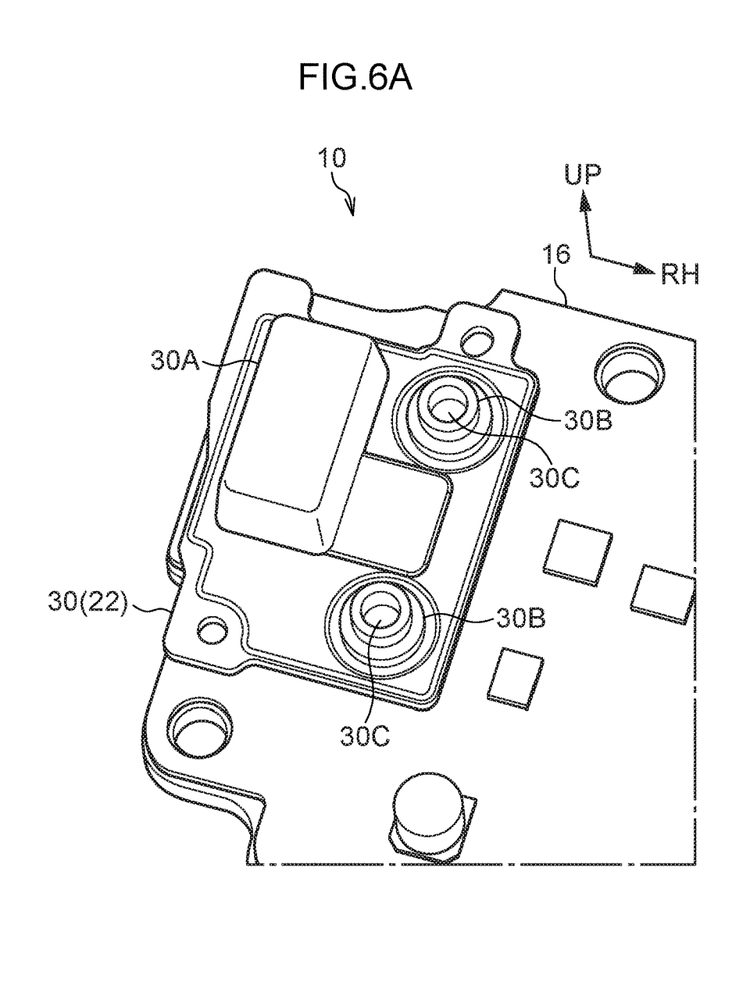
FIG. 6A is a perspective view of the cover plate of the P switch of the shift device pertaining to the first embodiment of the present disclosure as seen obliquely from the right and rear.

In the left portion of the cover plate 30, a cover dome 30A substantially in the shape of a cuboidal box and serving as a first increasing portion is integrally formed. The inside of the cover dome 30A opens downward, and the left column 26A of the holder 26 is disposed near the upper side of the cover dome 30A.

In the front portion and the rear portion of the right portion of the cover plate 30, tube portions 30B substantially in the shape of circular tubes and serving as deformation portions are integrally formed. The insides of the tube portions 30B open upward and downward, and the lower portions of the tube portions 30B are coaxially larger in diameter than the upper portions of the tube portions 30B. In lower end portions in the upper portions of the tube portions 30B, moving walls 30C in the shape of discs and serving as contact portions are coaxially integrally formed, and the moving walls 30C divide the insides of the tube portions 30B in the up and down direction. The right columns 26B of the holder 26 are in abutting contact with the upper sides of the tube portions 30B, and the tube portions 30B limit downward movement of the holder 26 and the operation frame 24. The tube portions 30B are elastically deformable downward, and thus the moving walls 30C are movable downward.

Figure 8A:
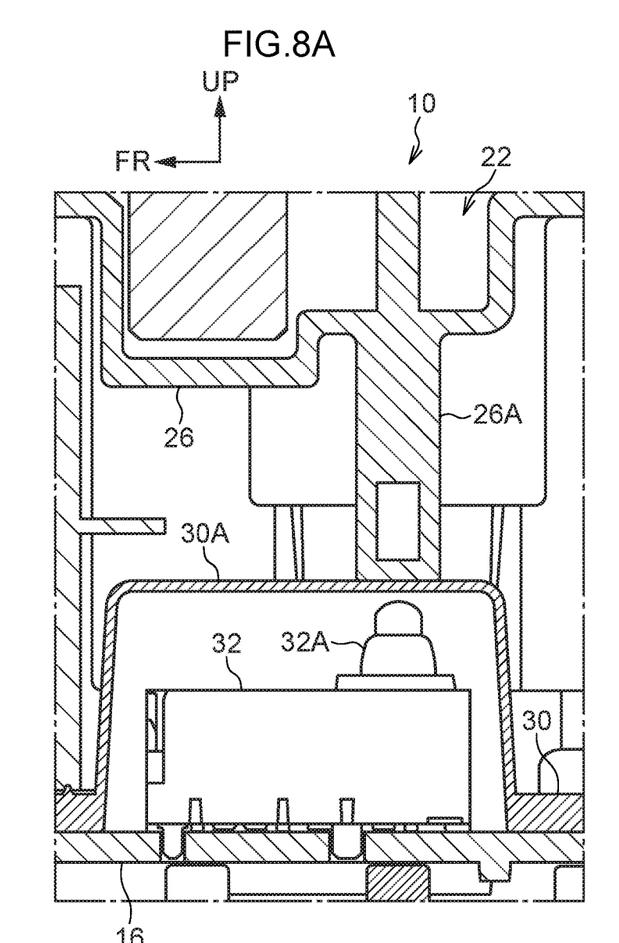
FIG. 8A is a sectional view of a tact switch and other parts of the P switch of the shift device pertaining to the first embodiment of the present disclosure as seen from the left.

Inside the cover dome 30A of the cover plate 30 is provided a tact switch 32 (see FIG. 3 and FIG. 8A) substantially in the shape of a cuboid, and the tact switch 32 is installed on the circuit board 16 and is electrically connected via the circuit board 16 to the control device 18. The tact switch 32 is provided with a moving column 32A substantially in the shape of a cylinder and serving as a contact portion, and the moving column 32A projects upward from the upper wall of the tact switch 32. The moving column 32A is disposed near the lower side of the upper wall of the cover dome 30A, and the moving column 32A is movable downward upon being pressed downward. Inside the tact switch 32, two contact switches (not shown in the drawings) are provided, and the two contact switches are switched ON at the same time as a result of the moving column 32A being moved downward.

On the lower side of the tube portion 30B located on the rear side (may also be the front side) of the cover plate 30 is provided a contact switch 34 (see FIG. 3) serving as an additional switch. The contact switch 34 is installed on the circuit board 16 and is electrically connected via the circuit board 16 to the control device 18. The contact switch 34 is switched ON as a result of the moving wall 30C of the tube portion 30B on the rear side being moved downward.

Next, the action of the present embodiment will be described.

In the shift device 10 of the above configuration, when the circuit board 16 detects that the shift position of the lever 14 has been changed to the R position, the N position, and the D position as a result of the lever 14 being pivotally operated in the front and rear direction, the shift range of the transmission 20 is changed to the reverse (R) range, the neutral (N) range, and the drive (D) range by the control of the control device 18.

Moreover, when the P switch 22 (the upper wall of the operation frame 24) is pressingly operated downward, the operation frame 24 and the holder 26 are moved downward. For this reason, the tube portions 30B of the cover plate 30 become elastically deformed downward by the right columns 26B of the holder 26, the moving walls 30C of the tube portions 30B are moved downward, and the contact switch 34 is switched ON (is operated). Furthermore, the cover dome 30A of the cover plate 30 becomes elastically deformed downward by the left column 26A of the holder 26, the moving column 32A of the tact switch 32 is moved downward, and the contact switches inside the tact switch 32 are switched ON (are operated). It will be noted that the contact switches inside the tact switch 32 are switched ON after the contact switch 34 has been switched ON. Because of this, the P switch 22 is switched ON and the shift range of the transmission 20 is changed to the park (P) range by the control of the control device 18 as a result of at least two of the contact switch 34 and the two contact switches inside the tact switch 32 being switched ON.

Here, the P switch 22 is provided with the tact switch 32, and the moving column 32A of the tact switch 32 is moved downward and the contact switches inside the tact switch 32 are switched ON as a result of the P switch 22 being pressingly operated downward. For this reason, the tact switch 32 produces an operating sound (a click sound) when the contact switches inside the tact switch 32 are switched ON, so the P switch 22 can produce an operating sound.

Furthermore, when the moving column 32A of the tact switch 32 begins to be moved downward, the operating load of the moving column 32A (the load for moving it downward) suddenly increases. For this reason, whereas the rate of increase in the operating load of the moving column 32A is small (0) before the moving column 32A begins to be moved downward, the rate of increase in the operating load of the moving column 32A suddenly becomes larger just after the moving column 32A has begun to be moved downward.

Here, before the moving column 32A begins to be moved downward, the cover dome 30A (particularly the upper wall) of the cover plate 30 becomes elastically deformed downward by the left column 26A of the holder 26. For this reason, even though the rate of increase in the operating load of the moving column 32A is small before the moving column 32A begins to be moved downward, the operating load of the P switch 22 can gradually be made larger by the elastic deformation of the cover dome 30A, and the rate of increase in the operating load of the P switch 22 can be made larger. Because of this, even though the rate of increase in the operating load of the moving column 32A suddenly becomes larger just after the moving column 32A has begun to be moved downward, the rate of increase in the operating load of the P switch 22 can be inhibited from suddenly becoming larger, so that the operating load of the P switch 22 can be gently increased and the operating feeling of the P switch 22 can be enhanced.

Furthermore, as mentioned above, the P switch 22 is switched ON as a result of at least two of the contact switch 34 and the two contact switches inside the tact switch 32 being switched ON. For this reason, the P switch 22 can be appropriately switched ON, and the shift range of the transmission 20 can be appropriately changed to the P range. Moreover, a fault in one of the contact switch 34 and the two contact switches inside the tact switch 32 can be detected.

Second Embodiment

Figure 6B:
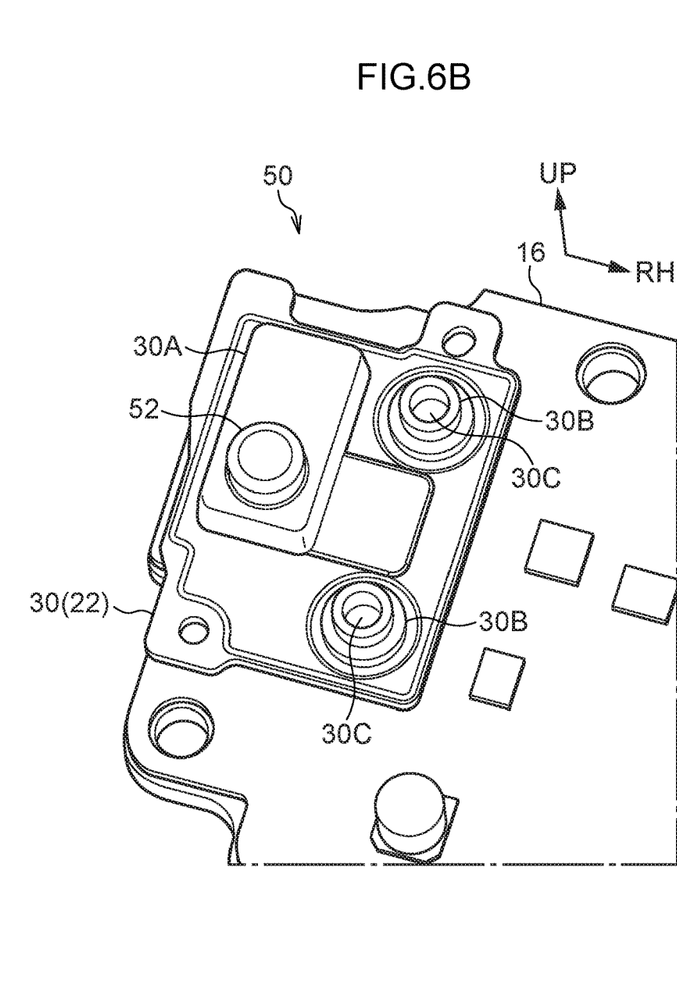
FIG. 6B is a perspective view of the cover plate of the P switch of a shift device pertaining to a second embodiment of the present disclosure as seen obliquely from the right and rear.
Figure 8B:
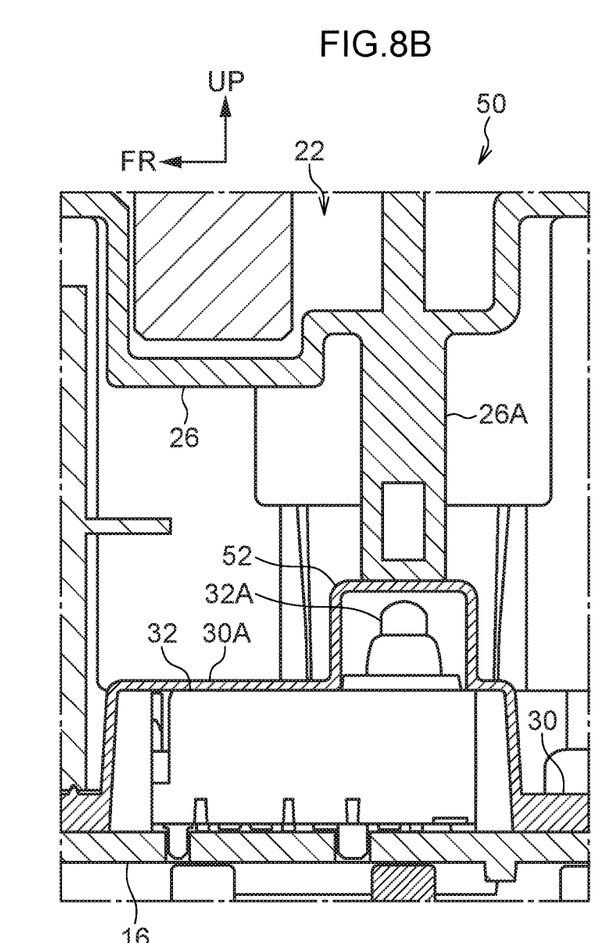
FIG. 8B is a sectional view of the tact switch and other parts of the P switch of the shift device pertaining to the second embodiment of the present disclosure as seen from the left.

In FIG. 6B the cover plate 30 of the P switch 22 of a shift device 50 pertaining to a second embodiment of the present disclosure is shown in a perspective view as seen obliquely from the right and rear, and in FIG. 8B the tact switch 32 and other parts of the P switch 22 of the shift device 50 are shown in a sectional view as seen from the left.

The shift device 50 pertaining to the present embodiment has substantially the same configurations as those of the first embodiment but differs in the following respects.

As shown in FIG. 6B and FIG. 8B, in the P switch 22 of the shift device 50 pertaining to the present embodiment, a projecting dome 52 in the shape of a bottomed circular tube and serving as a first increasing portion is integrally formed in the upper wall of the cover dome 30A of the cover plate 30. The projecting dome 52 projects upward, and its inside opens downward. The upper wall of the cover dome 30A is in contact with the upper surface of the tact switch 32, and the moving column 32A of the tact switch 32 is coaxially inserted inside the projecting dome 52. The upper wall of the projecting dome 52 is disposed near the upper side of the moving column 32A, and the left column 26A of the holder 26 is in contact with the upper wall of the projecting dome 52.

In this connection, when the P switch 22 (the upper wall of the operation frame 24) is pressingly operated downward, the operation frame 24 and the holder 26 are moved downward. For this reason, the tube portions 30B of the cover plate 30 become elastically deformed downward by the right columns 26B of the holder 26, the moving walls 30C of the tube portions 30B are moved downward, and the contact switch 34 is switched ON (is operated). Furthermore, the projecting dome 52 of the cover plate 30 becomes elastically deformed downward by the left column 26A of the holder 26, the moving column 32A of the tact switch 32 is moved downward, and the contact switches inside the tact switch 32 are switched ON (are operated).

Here, before the moving column 32A begins to be moved downward, the projecting dome 52 (particularly the upper wall) of the cover plate 30 becomes elastically deformed downward by the left column 26A of the holder 26. For this reason, even though the rate of increase in the operating load of the moving column 32A is small before the moving column 32A begins to be moved downward, the operating load of the P switch 22 can gradually be made larger by the elastic deformation of the projecting dome 52, and the rate of increase in the operating load of the P switch 22 can be made larger. Because of this, even though the rate of increase in the operating load of the moving column 32A suddenly becomes larger just after the moving column 32A has begun to be moved downward, the rate of increase in the operating load of the P switch 22 can be inhibited from suddenly becoming larger, so that the operating load of the P switch 22 can be gently increased and the operating feeling of the P switch 22 can be enhanced.

Consequently, in the present embodiment also, the same action and effects as those of the first embodiment can be achieved.

Third Embodiment

Figure 7A:
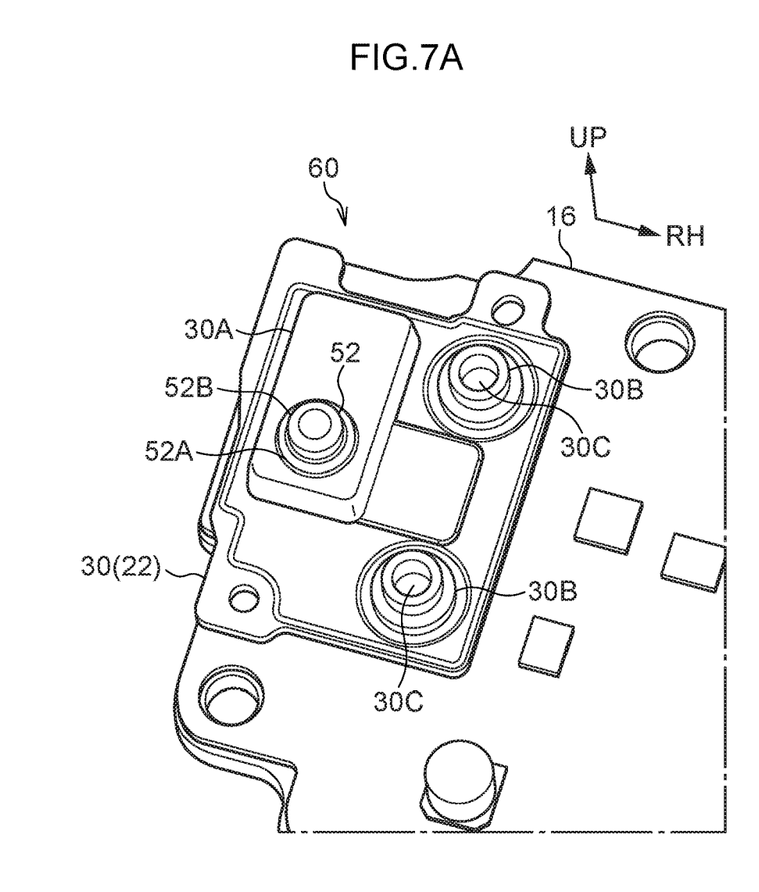
FIG. 7A is a perspective view of the cover plate of the P switch of a shift device pertaining to a third embodiment of the present disclosure as seen obliquely from the right and rear.
Figure 9A:
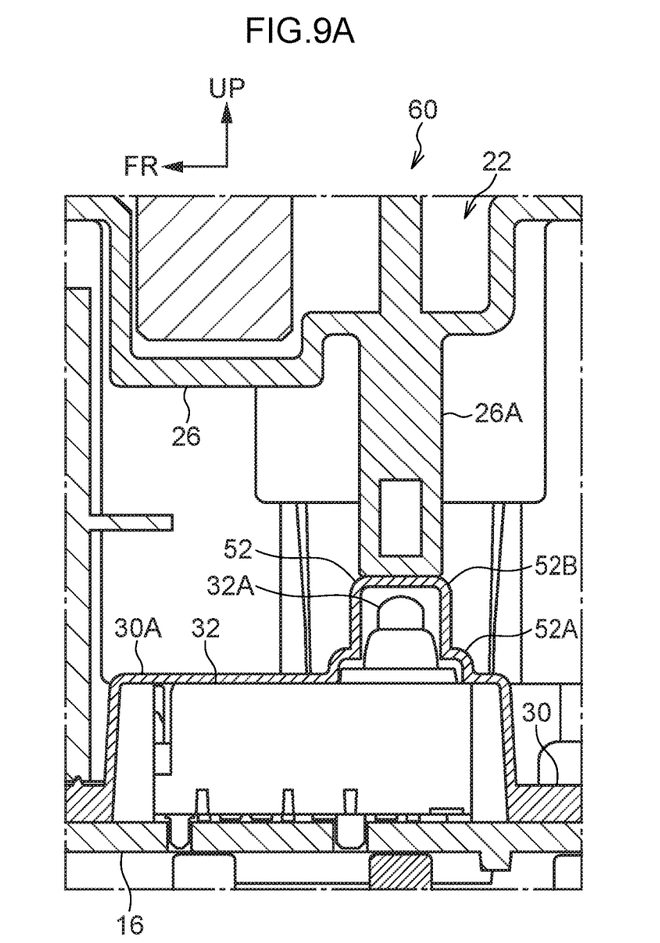
FIG. 9A is a sectional view of the tact switch and other parts of the P switch of the shift device pertaining to the third embodiment of the present disclosure as seen from the left.

In FIG. 7A the cover plate 30 of the P switch 22 of a shift device 60 pertaining to a third embodiment of the present disclosure is shown in a perspective view as seen obliquely from the right and rear, and in FIG. 9A the tact switch 32 and other parts of the P switch 22 of the shift device 60 are shown in a sectional view as seen from the left.

The shift device 60 pertaining to the present embodiment has substantially the same configurations as those of the second embodiment but differs in the following respects.

As shown in FIG. 7A and FIG. 9A, in the P switch 22 of the shift device 60 pertaining to the present embodiment, the portion other than the lower portion of the projecting dome 52 of the cover dome 30A of the cover plate 30 is coaxially reduced in diameter, so that the lower portion of the projecting dome 52 is a large diameter portion 52A serving as a first increasing portion, and the portion other than the lower portion of the projecting dome 52 is a small diameter portion 52B serving as a second increasing portion.

In this connection, when the P switch 22 (the upper wall of the operation frame 24) is pressingly operated downward, the operation frame 24 and the holder 26 are moved downward. For this reason, the tube portions 30B of the cover plate 30 become elastically deformed downward by the right columns 26B of the holder 26, the moving walls 30C of the tube portions 30B are moved downward, and the contact switch 34 is switched ON (is operated). Furthermore, the projecting dome 52 of the cover plate 30 becomes elastically deformed downward by the left column 26A of the holder 26, the moving column 32A of the tact switch 32 is moved downward, and the contact switches inside the tact switch 32 are switched ON (are operated). It will be noted that when the projecting dome 52 becomes elastically deformed downward, the small diameter portion 52B of the projecting dome 52 becomes elastically deformed downward after the large diameter portion 52A of the projecting dome 52 becomes elastically deformed downward.

Here, before the moving column 32A begins to be moved downward, the large diameter portion 52A of the projecting dome 52 of the cover plate 30 becomes elastically deformed downward by the left column 26A of the holder 26. For this reason, even though the rate of increase in the operating load of the moving column 32A is small before the moving column 32A begins to be moved downward, the operating load of the P switch 22 can gradually be made larger by the elastic deformation of the large diameter portion 52A of the projecting dome 52, and the rate of increase in the operating load of the P switch 22 can be made larger. Because of this, even though the rate of increase in the operating load of the moving column 32A suddenly becomes larger just after the moving column 32A has begun to be moved downward, the rate of increase in the operating load of the P switch 22 can be inhibited from suddenly becoming larger, so that the operating load of the P switch 22 can be gently increased and the operating feeling of the P switch 22 can be enhanced.

Consequently, in the present embodiment also, the same action and effects as those of the first embodiment can be achieved.

Furthermore, when the tube portions 30B of the cover plate 30 become elastically deformed downward by the right columns 26B of the holder 26, the upper portions of the tube portions 30B become elastically deformed downward after the lower portions of the tube portions 30B have become elastically deformed downward and the contact switch 34 has been switched ON. It will be noted that the contact switch 34 is switched ON after the moving column 32A has begun to be moved downward. Additionally, whereas the rate of increase in the operating load of the tube portions 30B (the load for elastically deforming them downward) is small (substantially 0) when the lower portions of the tube portions 30B become elastically deformed downward (before the upper portions of the tube portions 30B begin to be elastically deformed downward), the rate of increase in the operating load of the tube portions 30B suddenly becomes larger just after the upper portions of the tube portions 30B have begun to be elastically deformed downward.

Here, before the upper portions of the tube portions 30B begin to be elastically deformed downward, the small diameter portion 52B of the projecting dome 52 of the cover plate 30 becomes elastically deformed downward by the left column 26A of the holder 26. For this reason, even though the rate of increase in the operating load of the tube portions 30B is small before the upper portions of the tube portions 30B begin to be elastically deformed downward, the operating load of the P switch 22 can gradually be made larger by the elastic deformation of the small diameter portion 52B, and the rate of increase in the operating load of the P switch 22 can be made larger. Because of this, even though the rate of increase in the operating load of the tube portions 30B suddenly becomes larger just after the upper portions of the tube portions 30B have begun to be elastically deformed downward, the rate of increase in the operating load of the P switch 22 can be inhibited from suddenly becoming larger, so that the operating load of the P switch 22 can be gently increased and the operating feeling of the P switch 22 can be enhanced.

Fourth Embodiment

Figure 7B:
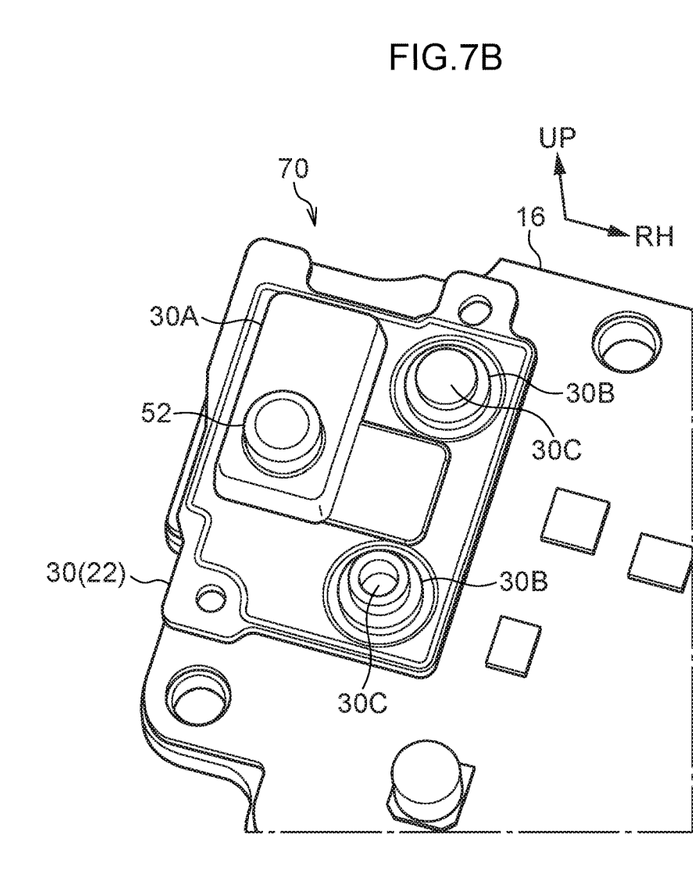
FIG. 7B is a perspective view of the cover plate of the P switch of a shift device pertaining to a fourth embodiment of the present disclosure as seen obliquely from the right and rear.
Figure 9B:
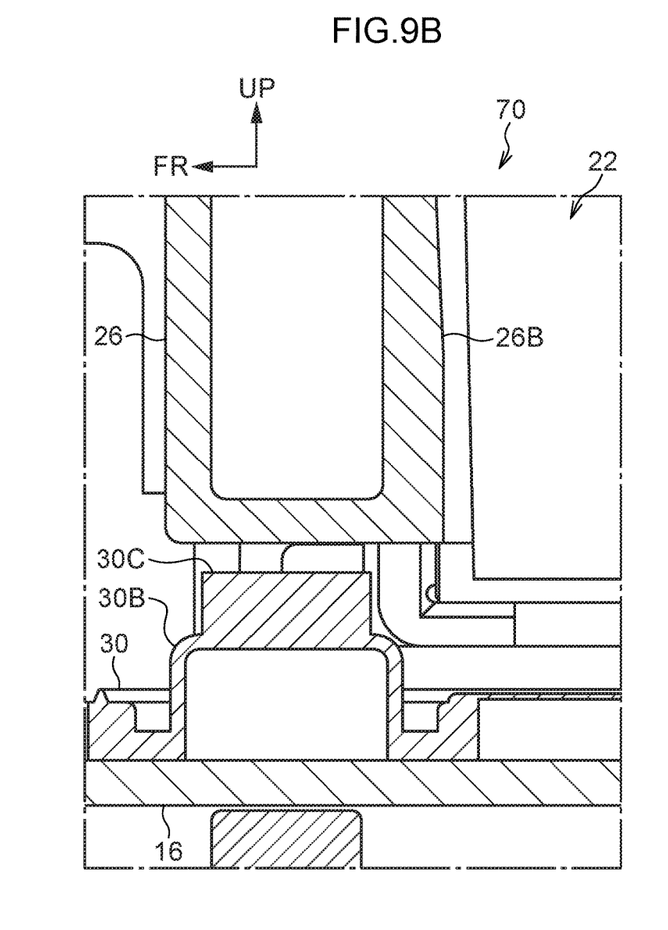
FIG. 9B is a sectional view of the cover plate and other parts of the P switch of the shift device pertaining to the fourth embodiment of the present disclosure as seen from the left.

In FIG. 7B the cover plate 30 of the P switch 22 of a shift device 70 pertaining to a fourth embodiment of the present disclosure is shown in a perspective view as seen from obliquely from the right and rear, and in FIG. 9B the cover plate 30 and other parts of the P switch 22 of the shift device 70 are shown in a sectional view as seen from the left.

The shift device 70 pertaining to the present embodiment has substantially the same configurations as those of the second embodiment but differs in the following respects.

As shown in FIG. 7B and FIG. 9B, in the P switch 22 of the shift device 70 pertaining to the present embodiment, the tube portion 30B on the front side of the cover plate 30 serves as a second increasing portion. The tube portion 30B on the front side is not provided with an upper portion because of the moving wall 30C, and the right column 26B of the holder 26 is disposed near the upper side of the tube portion 30B on the front side.

In this connection, when the P switch 22 (the upper wall of the operation frame 24) is pressingly operated downward, the operation frame 24 and the holder 26 are moved downward. For this reason, the tube portions 30B of the cover plate 30 become elastically deformed downward by the right columns 26B of the holder 26, the moving walls 30C of the tube portions 30B are moved downward, and the contact switch 34 is switched ON (is operated). Furthermore, the projecting dome 52 of the cover plate 30 becomes elastically deformed downward by the left column 26A of the holder 26, the moving column 32A of the tact switch 32 is moved downward, and the contact switches inside the tact switch 32 are switched ON (are operated).

Here, before the moving column 32A begins to be moved downward, the projecting dome 52 (particularly the upper wall) of the cover plate 30 becomes elastically deformed downward by the left column 26A of the holder 26. For this reason, even though the rate of increase in the operating load of the moving column 32A is small before the moving column 32A begins to be moved downward, the operating load of the P switch 22 can gradually be made larger by the elastic deformation of the projecting dome 52, and the rate of increase in the operating load of the P switch 22 can be made larger. Because of this, even though the rate of increase in the operating load of the moving column 32A suddenly becomes larger just after the moving column 32A has begun to be moved downward, the rate of increase in the operating load of the P switch 22 can be inhibited from suddenly becoming larger, so that the operating load of the P switch 22 can be gently increased and the operating feeling of the P switch 22 can be enhanced.

Consequently, in the present embodiment also, substantially the same action and effects as those of the first embodiment can be achieved.

Furthermore, when the tube portion 30B on the rear side of the cover plate 30 becomes elastically deformed downward by the corresponding right column 26B of the holder 26, the upper portion of the tube portion 30B on the rear side becomes elastically deformed downward after the lower portion of the tube portion 30B on the rear side has become elastically deformed downward and the contact switch 34 has been switched ON. It will be noted that the contact switch 34 is switched ON after the moving column 32A has begun to be moved downward. Additionally, whereas the rate of increase in the operating load of the tube portion 30B on the rear side (the load for elastically deforming it downward) is small (substantially 0) when the lower portion of the tube portion 30B on the rear side is elastically deformed downward (before the upper portion of the tube portion 30B on the rear side begins to be elastically deformed downward), the rate of increase in the operating load of the tube portion 30B on the rear side suddenly becomes larger just after the upper portion of the tube portion 30B on the rear side has begun to be elastically deformed downward.

Here, before the upper portion of the tube portion 30B on the rear side begins to be elastically deformed downward, the tube portion 30B on the front side becomes elastically deformed downward by the corresponding right column 26B of the holder 26. For this reason, even though the rate of increase in the operating load of the tube portion 30B on the rear side is small before the upper portion of the tube portion 30B on the rear side begins to be elastically deformed downward, the operating load of the P switch 22 can gradually be made larger by the elastic deformation of the tube portion 30B on the front side, and the rate of increase in the operating load of the P switch 22 can be made larger. Because of this, even though the rate of increase in the operating load of the tube portion 30B on the rear side suddenly becomes larger just after the upper portion of the tube portion 30B on the rear side has begun to be elastically deformed downward, the rate of increase in the operating load of the P switch 22 can be inhibited from suddenly becoming larger, so that the operating load of the P switch 22 can be gently increased and the operating feeling of the P switch 22 can be enhanced.

In the preceding embodiments, the shift switch is the P switch 22. However, the shift switch may also be the reverse (R) switch, the neutral (N) switch, the drive (D) switch, or a manual (M) switch.

Furthermore, in the preceding embodiments, the shift devices 10, 50, 60, and 70 are installed in the console of the vehicle. However, the shift devices 10, 50, 60, and 70 may also be installed in another part (e.g., an instrument panel or a steering column) of the vehicle.

What is claimed is:

1. A shift device comprising:
   a shift switch that, when operated, is configured to change a shift range of a transmission of a vehicle;
   a cover member that is provided in the shift switch that is elastically deformable and which includes a first increasing portion and a second increasing portion that is lower in height than the first increasing portion;
   a tact switch that is provided inside the first increasing portion and is operated as a result of the shift switch being operated; and
   an additional switch that is provided on a lower side of the second increasing portion and is operated as a result of the shift switch being operated.

2. The shift device of claim 1, wherein the first increasing portion increases an operating load of the shift switch before a rate of increase in an operating load of the tact switch changes from a small state to a large state.

3. The shift device of claim 1, wherein the second increasing portion increases an operating load of the shift switch before a rate of increase in an operating load of the additional switch changes from a small state to a large state.

4. The shift device of claim 1, wherein the shift range of the transmission is changed as a result of the tact switch and the additional switch being operated.

5. The shift device of claim 1, wherein a plurality of contact switches are provided inside the tact switch.

6. The shift device of claim 5, wherein the tact switch is provided with a moving column that is movable downward upon being pressed downward and the plurality of contact switches are operated as a result of the moving column being moved downward.

7. A shift device comprising:
   a shift switch that, when operated, is configured to change a shift range of a transmission of a vehicle;
   a tact switch that is provided in the shift switch and is operated as a result of the shift switch being operated;
   an additional switch that is provided in the shift switch;
   a cover member that is elastically deformable,
   wherein the additional switch includes a plurality of contact switches and the cover member is located on the tact switch and the contact switches.

* * * * *